(12) United States Patent
Westerberg et al.

(10) Patent No.: US 9,642,063 B2
(45) Date of Patent: May 2, 2017

(54) MOVING ACCESS POINT INDICATION

(75) Inventors: Erik Westerberg, Enskede (SE);
Muhammad Kazmi, Bromma (SE);
Gunnar Mildh, Sollentuna (SE);
Oumer Teyeb, Solna (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 246 days.

(21) Appl. No.: 14/238,948

(22) PCT Filed: Aug. 16, 2012

(86) PCT No.: PCT/SE2012/050879
§ 371 (c)(1),
(2), (4) Date: Feb. 14, 2014

(87) PCT Pub. No.: WO2013/025168
PCT Pub. Date: Feb. 21, 2013

(65) Prior Publication Data
US 2014/0247807 A1 Sep. 4, 2014

Related U.S. Application Data

(60) Provisional application No. 61/523,973, filed on Aug. 16, 2011.

(51) Int. Cl.
*H04W 4/00* (2009.01)
*H04W 36/36* (2009.01)
(Continued)

(52) U.S. Cl.
CPC ........... *H04W 36/36* (2013.01); *H04W 36/32* (2013.01); *H04W 36/34* (2013.01); *H04W 36/14* (2013.01); *H04W 48/18* (2013.01); *H04W 84/005* (2013.01)

(58) Field of Classification Search
CPC .............................. H04W 80/04; H04W 36/18
See application file for complete search history.

(56) References Cited

U.S. PATENT DOCUMENTS

| | | | | |
|---|---|---|---|---|
| 2007/0213049 A1* | 9/2007 | Bishop | ................. | H04W 60/00 455/432.3 |
| 2008/0014957 A1* | 1/2008 | Ore | ................... | H04W 36/0088 455/452.1 |

(Continued)

FOREIGN PATENT DOCUMENTS

| | | | | |
|---|---|---|---|---|
| EP | 2 112 858 A1 | | 10/2009 | |
| FI | EP 2112858 A1 * | | 10/2009 | ............ H04W 36/32 |

OTHER PUBLICATIONS

Part 11: Wireless LAN Medium Access Control (MAC) and Physical Layer (PHY) Specifications; Amendment 9: Interworking with External Networks; IEEE Computer Society; Sponsored by the LAN/MAN Standards Committee; IEEE Std 802.11u-2011.

(Continued)

*Primary Examiner* — Samina Choudhry
(74) *Attorney, Agent, or Firm* — Baker Botts, LLP

(57) ABSTRACT

A user equipment, UE, (20) determines a mobility state of a Wi-Fi access point, AP, as one of a moving mobility state and a non-moving mobility state along with control information relating to UE cell (re-)selection and/or handover behavior based on the determined mobility state of the Wi-Fi access point, AP. The UE then controls its cell (re-)selection and/or handover behavior in relation to the Wi-Fi access point, AP based on the determined control information. In a preferred embodiment, the UE can communicate with a cellular base station, BS, and with the Wi-Fi access point, AP. The UE detects the Wi-Fi AP, determines that the Wi-Fi AP is moving based on a moving AP indication, and controls cell (re-Selection and/or handover behavior of the UE based (Continued)

on the determination that the Wi-Fi AP is moving along with other information.

14 Claims, 14 Drawing Sheets

(51) Int. Cl.
*H04W 36/32* (2009.01)
*H04W 36/34* (2009.01)
*H04W 36/14* (2009.01)
*H04W 48/18* (2009.01)
*H04W 84/00* (2009.01)

(56) References Cited

U.S. PATENT DOCUMENTS

2011/0124330 A1 5/2011 Kojima
2011/0310842 A1* 12/2011 Eisl .................. H04W 36/0072
370/331

OTHER PUBLICATIONS

PCT Notification Concerning Transmittal of International Preliminary Report on Patentability (Chapter 1 of the Patent Cooperation Treaty), and Written Opinion of the International Searching Authority; RE: Intl. Appln. PCT/SE2012/050879 mailed Feb. 27, 2014 (Feb. 27, 2014); Int'l filing date Aug. 16, 2012 (Aug. 16, 2012); (18 pgs).
International Search Report for International Application No. PCT/SE2012/050879, Nov. 7, 2012.
IEEE P802.11 Wireless LANs; LB-137 Venue Group & Venue Type Update by Necati Canpolat of Intel Corporation.

* cited by examiner

| Venue Group code | Venue Group description |
|---|---|
| 0 | Unspecified |
| 1 | Asembly |
| 2 | Business |
| 3 | Educational |
| 4 | Factory and Industrial |
| 5 | Insitutional |
| 6 | Mercantile |
| 7 | Residential |
| 8 | Storage |
| 9 | Utility and Miscellaneous |
| 10 | Vehicular |
| 11 | Outdoor |
| 12 - 255 | Reserved |

Figure 6

| Venue Group code | Venue Type code | Venue description |
|---|---|---|
| 7 | 2 | Hotel or Motel |
| 7 | 3 | Dormitory |
| 7 | 4 | Boarding House |
| 7 | 5 - 255 | Reserved |
| 8 | 0 | Unspecified Storage |
| 8 | 1 - 255 | Reserved |
| 9 | 0 | Unspecified Utility and Miscellaneous |
| 9 | 1 - 255 | Reserved |
| 10 | 0 | Unspecified Vehicular |
| 10 | 1 | Automobile or Truck |
| 10 | 2 | Airplane |
| 10 | 3 | Bus |
| 10 | 4 | Ferry |
| 10 | 5 | Ship or Boat |
| 10 | 6 | Train |
| 10 | 7 | Motor Bike |
| 10 | 8 - 255 | Reserved |
| 11 | 0 | Unspecified Outdoor |

Figure 7

MOVING ACCESS POINT INDICATION

PRIORITY

This nonprovisional application is a National Stage Filing under 35 U.S.C. §371 of International Patent Application Serial No. PCT/SE2012/050879, filed Aug. 16, 2012 and entitled "Moving Access Point Indication," which claims the benefit of U.S. Provisional Application No. 61/523,973, filed Aug. 16, 2011 and entitled "Mobility State Aware Mobile Relay Operation."

TECHNICAL FIELD

The technology relates to radio communications, and in particular, to wireless networks that use movable/mobile radio access points, APs.

INTRODUCTION

Increasing uptake of the mobile broadband services and end-user requirements to always being wirelessly "connected" have driven a new generation of base stations and access points. A majority of these base stations are relatively smaller in size, have a relatively lower output power, and cover a smaller area as compared to conventional cellular base stations, sometimes called macro base stations. Such smaller base stations can extend the coverage of cellular networks, enhance capacity in hotspots, increase effective cell throughput, and reduce average radio-transmission power at the User Equipment, UE, especially in highly shadowed areas, thereby leading to longer UE battery life. Because of these advantages, Long-Term Evolution, LTE-Advanced, corresponding to 3rd Generation Partnership Project (3GPP) Release 10 of the LTE standard, introduced support for Relay Nodes, RNs, which are an example of a smaller base station. Another example of a smaller base station includes Access Points, APs, such as specified in the Institute of Electrical and Electronics Engineers, IEEE, 802.11 family of standards.

A goal with smaller base stations is to support several wireless access technologies, e.g., Global System for Mobile Communications (GSM), Wideband Code Division Multiple Access (WCDMA), LTE, and Wireless Fidelity, WiFi, in one physical base station node and interwork with macro base stations to provide a continuous mobile broadband access network providing seamless mobility throughout the network to the end users. The small base stations may be deployed both indoors and outdoors and even inside moving vehicles such as in trains, buses, ships, taxis, trucks, and private cars. While many small base stations may be managed by a mobile operator, some of the access points may be private—and hence may be used only by selected subscribers. Alternatively, they may be completely open to anyone, e.g., as a courtesy service from a shop owner, town, or other.

These kinds of deployments that include macro and smaller base stations are generically referred to as Heterogeneous Networks, Hetnet. Typically, there will be overlapping coverage provided by a set of base stations at any one point, which means that a mobile radio station at any one position may connect to a multitude of base stations. Mobile radio stations are also referred to as User Equipments, UEs. In this type of situation, it is important to select an optimal base station for a UE to connect to at any one time. For example, one aspect of the base station selection process is that a UE should preferably not connect to a base station that in a short time will no longer be in radio range of the UE.

One example of such a situation occurs if the UE is moving, e.g., the UE is located in a moving train. While moving, especially at higher speeds, the UE should ideally not connect to a small cell with a relatively short range because the UE will likely be outside its cell coverage in a short period of time.

A similar problem occurs when the base station itself is moving at high speed, e.g., the base station is located inside a train, a bus, or other vehicle. In this case, UEs not moving along with the base station should preferably not attach to the moving base station. A stationary UE that attaches to a moving base station may lead to two unnecessary handoffs in a very short period of time: one handoff into the cell of the moving base station and a second handoff out from that moving base station cell. This unwanted mobility signaling in the network can be quite significant if every UE around a moving bus connects and de-connects to an on-board base station as the bus moves through a busy downtown area.

Another drawback is the risk of poor end-user performance and dropped calls associated with a cell change. This risk, in the case of a moving base-station, is particularly large since the time from good radio connectivity to no radio satisfactory connectivity with the cell may be very short. This also increases the risk that a controlled handoff will not be performed before connectivity is lost.

Yet another problem is that an on-board base station is likely to be dimensioned for on-board traffic. If surrounding stationary UEs also attach to the on-board base station, then there is a high risk that the on-board base station and its backhaul network may become congested, resulting in poor performance both for the on-board UEs and the surrounding stationary UEs trying to connect to that base station. These problems become even more severe in areas with a large number of different on-board base stations such as a bus terminal, a train station, or generally a busy city environment with many taxis and buses passing by.

What is needed is technology for resolving these and other problems that may be caused by moving base stations in communication systems.

SUMMARY

A user equipment, UE, includes radio circuitry that communicates with a radio node and processing circuitry that determines a mobility state of the radio node as one of a moving mobility state and a non-moving mobility state. The processing circuitry also determines control information relating to UE cell (re-)selection and/or handover behavior based on the determined mobility state of the radio node. Based on the determined control information, the processing circuitry controls UE cell (re-)selection and/or handover behavior in relation to the radio node.

In example embodiments, the UE radio circuitry may communicate with a Wi-Fi access point, AP. The UE processing circuitry detects the Wi-Fi AP and determines whether the Wi-Fi AP is moving based on a moving AP indication. A non-limiting example of a moving AP indication includes AP venue information. Based on the determination that the Wi-Fi AP is moving and other information and/or policies known by the UE, the processing circuitry is enabled to control the UE cell (re-)selection and/or handover behavior. In example implementations, the processing circuitry may determine that the Wi-Fi AP is moving based on a beacon frame or a probe response frame received from the Wi-Fi AP that includes the moving AP indication or an Access Network Query Protocol, ANQP, signaling that includes the moving AP indication.

In other example embodiments, the UE radio circuitry is also configured to communicate with a cellular base station, BS. In such embodiments, the UE processing circuitry generates a neighbor cell report that includes the cell served by the Wi-Fi AP as a neighbor cell in the report and the moving AP indication for the Wi-Fi AP, and the radio circuitry transmits the neighbor cell report to the cellular BS. In addition, the UE may receive from the cellular BS network-based cell (re-)selection or handover control information determined based on the moving AP indication. The UE decides whether to connect to the Wi-Fi AP based on the network-based cell (re-)selection or handover control information. In another example embodiment, the UE radio circuitry receives other information from the cellular BS based on the moving AP indication, and the processing circuitry is enabled to decide whether to connect to the Wi-Fi AP based on the received information and the determined mobility state of the Wi-Fi AP.

In yet another example embodiment, the UE is configured by a user to detect and process a moving AP indication. Thereafter, the UE processing circuitry receives from the user of the UE a user decision whether to perform a cell (re-)selection and/or handover to the Wi-Fi AP based on the moving AP indication. In this example, the other information may include the user's decision or policies configured by the user.

In yet another example embodiment, the UE is configured by a network operator to detect and process moving AP indications. Thereafter, the UE processing circuitry decides locally at the UE whether to perform a cell (re-)selection and/or handover to the Wi-Fi AP based on the moving AP indication. In one example implementation, the UE is configured by a network operator with policy information to detect and process moving AP indications. In this case, the other information includes the policy information.

Another aspect of the technology includes a method implemented in a UE comprising the following steps:

a—determining a mobility state of a radio node as one of a moving mobility state and a non-moving mobility state;

b—determining control information relating to UE cell (re-)selection and/or handover behavior based on the determined mobility state of the radio node; and c—controlling UE cell (re-)selection and/or handover behavior in relation to the radio node based on the determined control information.

Another aspect of the technology includes a computer product embodied in a non-transitory, computer-readable storage medium containing instructions, which when executed by data processing circuitry, perform the above method and other methods described below.

Another aspect of the technology includes a radio base station in an example embodiment that establishes a connection with a UE. Thereafter, the base station receives a neighbor cell report from the UE including a moving AP indication and provides the UE with a cell (re-)selection and/or handover decision node based on the moving AP indication.

Still another aspect of the technology includes a Wi-Fi access point, AP, that communicates with one or more UEs. Processing circuitry in the AP transmits a signal to UEs within range including a moving AP indication as to whether the Wi-Fi AP is moving to permit a cell (re-)selection and/or handover decision for the UE with respect to the Wi-Fi AP based on the moving AP indication

BRIEF DESCRIPTION OF THE DRAWINGS

FIG. 6 illustrates an example venue group subfield information field in IEEE 802.11u;

FIG. 7 illustrates a subset of the example venue group subfield information field in IEEE 802.11u shown in FIG. 6;

DETAILED DESCRIPTION

Figure 1:
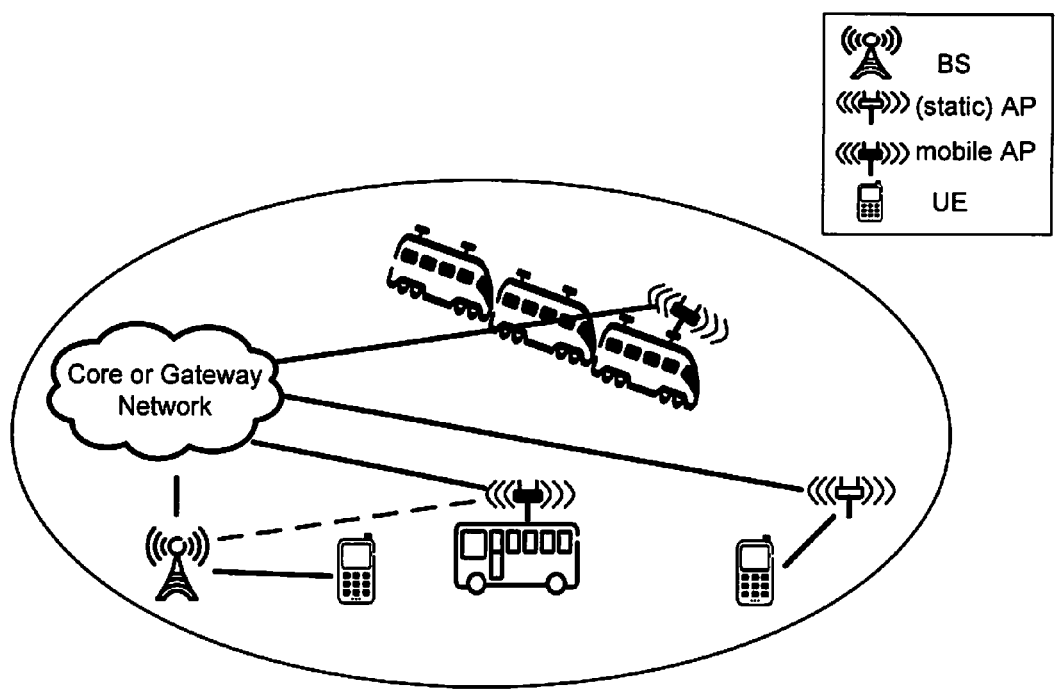
FIG. 1 illustrates an example scenario showing mobile and static APs communicating directly or indirectly with a core or gateway network.

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not to obscure the description with unnecessary detail. Those skilled in the art will appreciate that the functions described may be implemented in one or more nodes using hardware circuitry, e.g., analog and/or discrete logic gates interconnected to perform a specialized function, such as ASICs, Programmable Logic Arrays (PLAs), etc., and/or using software programs and data in conjunction with one or more digital microprocessors or general purpose computers. Nodes that communicate using the air interface also have suitable radio communications circuitry. Moreover, the technology can additionally be embodied within any form of non-transitory, computer-readable memory, such as solid-state memory, magnetic disk, or optical disk containing an appropriate set of computer instructions that would cause one or more processors to carry out the techniques described herein.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be implemented by computer program instructions that may be stored in a non-transitory, computer-readable storage medium and which when executed by one or more computers or processors cause the processes to be performed, whether or not such computer(s) or processor(s) is(are) explicitly shown.

Hardware implementation may include or encompass, without limitation, digital signal processor (DSP) hardware, a reduced instruction set processor, hardware, e.g., digital or analog, circuitry including but not limited to application specific integrated circuit(s) (ASIC) and/or field programmable gate array(s) (FPGA(s)), and, where appropriate, state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The functions of the various elements including functional blocks, including but not limited to those labeled or described as a computer, processor, or controller, may be provided through the use of hardware such as circuit hardware and/or hardware capable of executing software in the form of coded instructions stored on non-transitory, computer-readable medium. Thus, such functions and illustrated functional blocks are to be understood as being either hardware-implemented and/or computer-implemented, and thus machine-implemented.

FIG. 1 illustrates an example scenario showing mobile APs communicating directly with a core or gateway network, as shown illustrated in the moving train and bus examples via a solid line, or indirectly via a macro base station, BS, as shown illustrated in the moving bus example via a dashed line. In addition, a static AP connects directly to the core or gateway network. UEs are shown connected to a macro BS and to a fixed AP. UEs not shown are located inside the train and bus. The core or gateway network provides access to the Internet and/or other networks.

Figure 2:
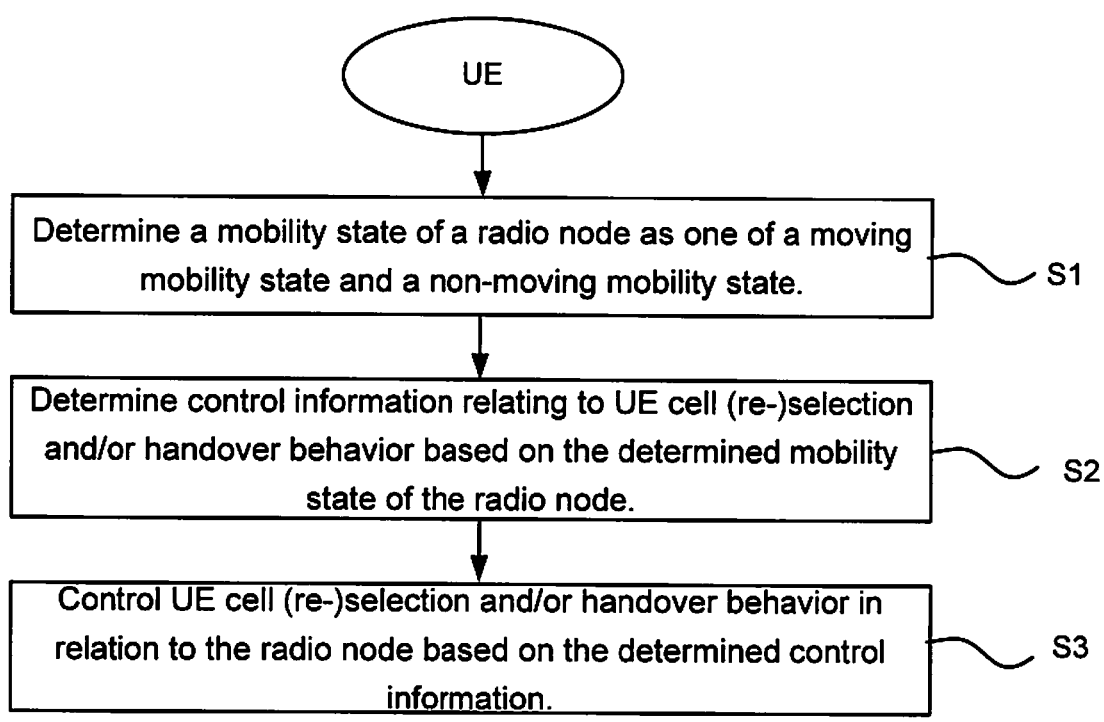
FIG. 2 is a flowchart illustrating example steps for a UE determining a mobility state of a radio node and taking action base thereon.

The technology in this application allows a UE to determine a mobility state of a radio node and use that to intelligently influence the UE's operation. One example of a radio node is a base station. Reference is made to the flowchart diagram in FIG. 2. The UE includes radio circuitry that communicates with a radio node and processing circuitry that determines a mobility state of the radio node as one of a moving mobility state and a non-moving mobility state (step S1). The processing circuitry also determines control information relating to UE cell (re-)selection and/or handover behavior based on the determined mobility state of the radio node (step S2). Based on the determined control information, the processing circuitry controls UE cell (re-)selection and/or handover behavior in relation to the radio node (step S3).

For purposes of the rest of the application, a small base station is referred to as an access point, AP, and an AP is a Wi-Fi radio base station or any radio base station containing Wi-Fi technology in combination with one or more other type of radio communications technology.

One approach to the problem of non-strategic or undesired handover involving moving APs is to use time hysteresis where an AP is selected for a handover but no handover occurs for a given time period. But the hysteresis approach does not work well for on-board moving AP scenarios. For example, a time hysteresis approach does not cover a situation where a moving AP is temporarily stationary, which happens frequently in, e.g., a bus or taxi scenario where the bus or taxi has stopped for a traffic light or in traffic congestion. With a time hysteresis method, the UE may wait five seconds and then connect to an on-board AP—just in time for the traffic light to turn green and the on-board AP moves out of range. Nor is a longer hysteresis time a better approach. A longer hysteresis time, e.g., 30 seconds, delays the time for the UE to connect to the on-board AP equipment, hence risking poor performance for those UEs. Moreover, a time hysteresis approach does not address the problem of potential overloading of on-board APs from surrounding stationary UEs.

Figure 3:
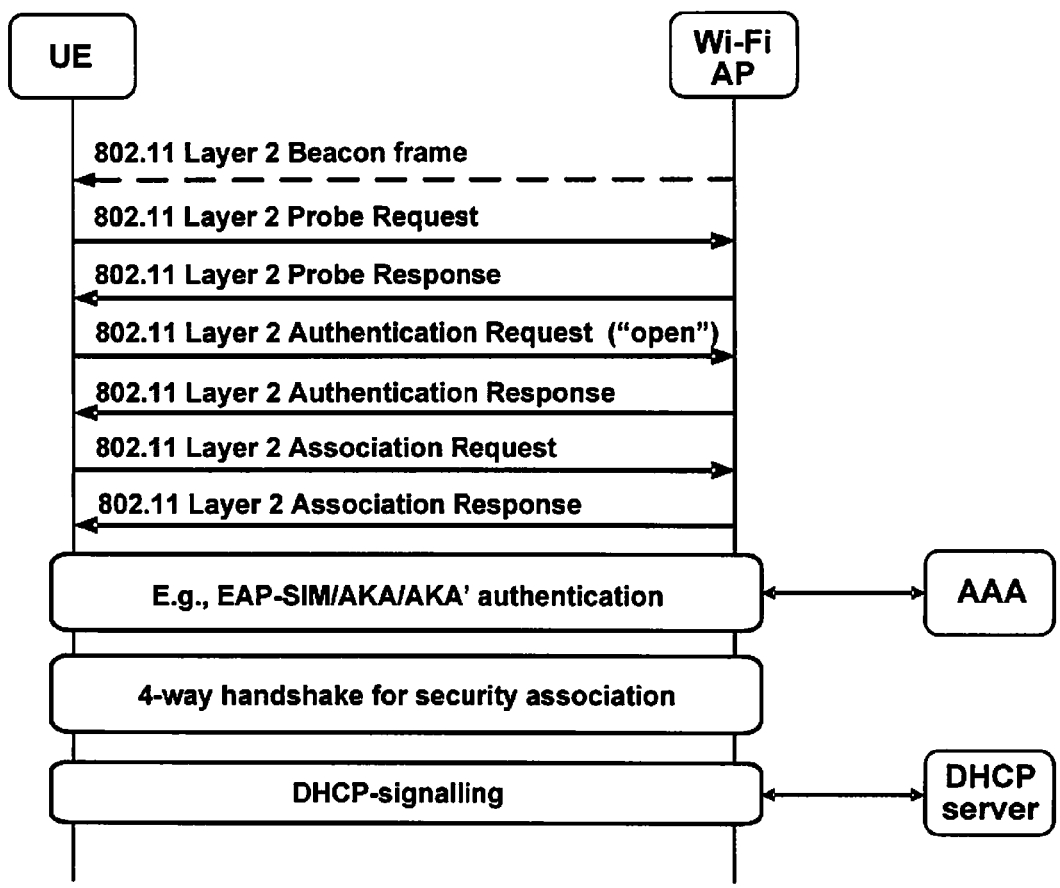
FIG. 3 is a diagram showing example IEEE 802.11 signaling between a UE and an AP.

Another approach is to have a Wi-Fi AP declare its "venue status" using information elements that indicate whether the AP is mounted on or otherwise positioned in a vehicle. The Wi-Fi IEEE standard 802.11 specifies a beacon frame as one of the management frames in IEEE 802.11 based Wireless Local Area Networks (WLANs) and it contains information about the network. Beacon frames are transmitted periodically to announce the presence of a Wireless LAN network and are transmitted by the Access Point (AP) in an infrastructure Basic Service Set (BSS). A probe request frame is sent from a station when it requires information from the access point, and after receiving a probe request frame, the AP sends a probe response frame containing capability information, supported data rates, etc. In addition, there are multiple different frames like data frames, control frames, and other management frames. In an infrastructure Wi-Fi network, UEs must associate with an access point to obtain network services. Association is the process by which a UE joins an 802.11 network. UEs always initiate the association process, and access points may choose to grant or deny access based on the contents of an association request. When a UE moves between basic service areas within a single extended service area, it must evaluate signal strength and perhaps switch the access point with which it is associated. FIG. 3 is an example signalling diagram showing several Wi-Fi procedures.

Figure 4:
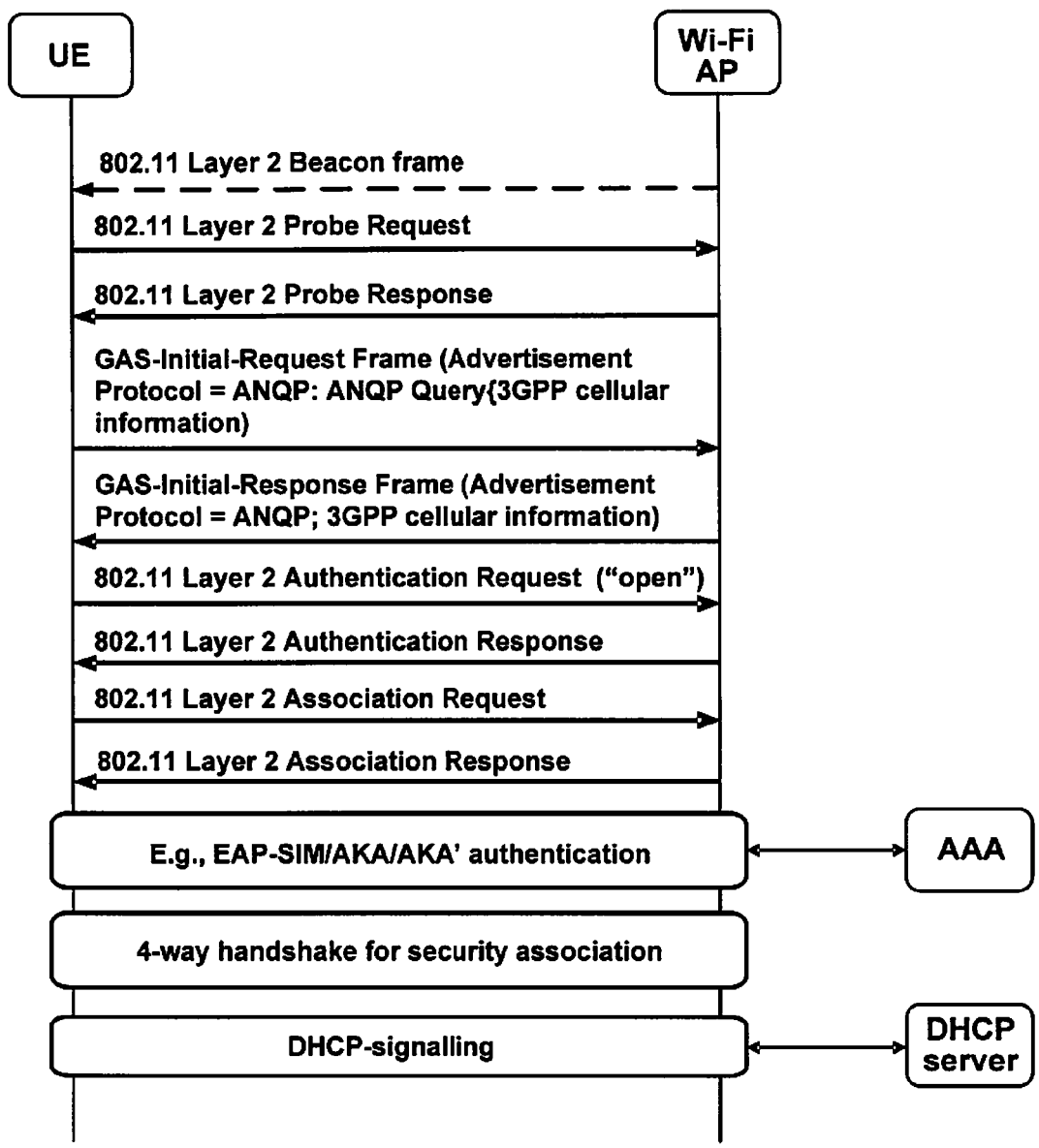
FIG. 4 a diagram showing example ANQP signaling in relation to the IEEE 802.11 signaling shown in FIG. 3.

The Wi-Fi Alliance is working on a Hot-Spot 2.0 (HS2.0) initiative, now called PassPoint. HS2.0 is primarily geared toward Wi-Fi networks, and thus, builds on IEEE 802.11u by adding requirements on authentication mechanisms and auto-provisioning support. See IEEE Std 802.11u™-2011, Part 11: Wireless LAN Medium Access Control (MAC) and Physical Layer (PHY) Specifications, Amendment 9: Interworking with External Networks. Although the current release of HS2.0 is not geared toward 3GPP interworking, it is desirable from a network operator perspective to introduce additional traffic steering capabilities and leveraging HS2.0 802.11u mechanisms that can provide 3GPP interworking requirements. HotSpot 2.0 uses Access Network Query Protocol, ANQP, as part of network discovery and selection. ANQP provides a mechanism for the UE to request different information from an AP before association. FIG. 4 includes an example signal ANQP exchange in the Wi-Fi access procedure of FIG. 3 where ANQP is carried using a Generic Advertisement Services (GAS) protocol.

Figure 5:
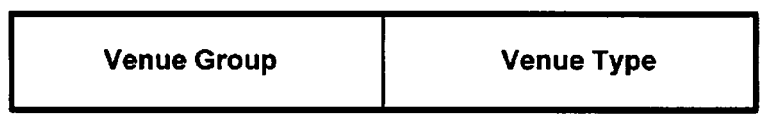
FIG. 5 illustrates an example venue information field in IEEE 802.11u.

IEEE 802.11u defines AP Venue Information as a 2-octet field that contains Venue Group and Venue Type subfields as shown in FIG. 5. The AP Venue Information may be sent to a UE for example using the Beacon frame or via ANQP signaling. It can also be included in the Probe Response frame. The 802.11u coding for a Venue Group subfield is shown in FIG. 6, and the coding for a subset of the Venue Type subfield is shown in FIG. 7. See section 7.3.1.34 the 802.11u standard. Venue group code 10 is named "vehicular" and includes for example automobiles, trucks, airplanes, buses, ferries, ships, boats, trains, bikes, etc.

In one example embodiment, an AP may use the venue field to signal its mobility status to the UEs. The venue field does not provide information about whether the AP is actually currently moving or not, e.g., a UE will not know from a received venue field from an AP in a bus, i.e., "venue=bus," whether the bus is actually moving. For example, a tour bus may be parked for the day (stationary) but still offer Wi-Fi to its bus riders and perhaps others when close to the bus. Although UE may infer from the venue field specifying a vehicle that the AP is mobile, and based on this information, cell (re-)selection and handover decisions may be made. However, the venue field is just one out of multiple possible ways of indicating that an AP is mobile. Other ways of indicating that an AP is mobile include a dedicated signaling message from the AP to a UE either broadcast or sent in unicast from the AP.

Figure 8:
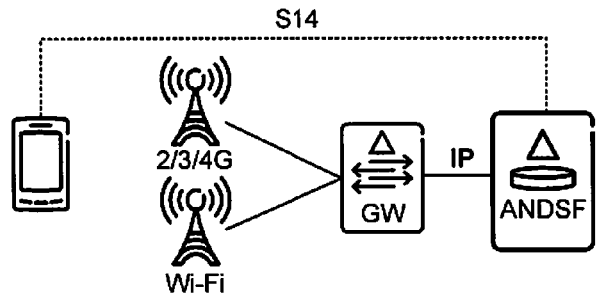
FIG. 8 is a diagram conceptually showing a main principle of ANDSF.

Policies may be used to assist and control the access to different types of networks. Inter-System Mobility Policies and Inter-System Routing Policies are described below as examples of policies. Regarding provisioning of policies to UEs, different types of static or dynamic policies can be downloaded to UEs using different mechanisms such as (1) SIM/USIM based policies controlled by the operator and the end user, (2) Device Management (DM) based policies, (3) HotSpot 2.0 policies, and (4) Access Network Discovery and Selection, ANDSF, policies. The cellular network, e.g., 3GPP, defined function ANDSF may be used to send different policies to the UE for network discovery and selection as shown in FIG. 8. The communication between the UE and an ANDSF server in the cellular network is defined as an IP-based S14-interface. The ANDSF server provides access discovery information to the UE, which can assist the UE to discover available 3GPP and non-3GPP access networks without the burden of continuous background scanning as can be seen in FIG. 8.

More generally, policies are a set of rules that determine if, when, where, and how a UE can access and use Wi-Fi. The rules/policies are typically created and controlled by the operator and signaled to various nodes such as base stations, mobility management nodes, gateways, and UEs. Policies may be used to steer users and UEs to or away from Wi-Fi or cellular service from a particular node depending on location, service used, subscriber identity, subscription type, time of the day, and/or more.

Inter-System Mobility Policies (ISMP) provided to the UE from the ANDSF server are policies which guide the UE to select the most preferable 3GPP or non-3GPP access technology. The ISMP are used for UEs that access a single access, e g 3GPP or Wi-Fi, at a time. Inter-System Routing Policies (ISRP) are policies provided to the UE from the ANDSF server which guide the UE to select over which access a certain type of traffic for example defined per Access Point Name (APN) shall be routed. The ISRP are used for UEs that access both 3GPP and Wi-Fi simultaneously.

The description above shows how Venue Information may be used as an example of a moving AP indication provided from a Wi-Fi AP to a UE using beacon frames, probe response frames, or ANQP signalling along with different examples of provisioning policies to the UE.

The technology described here shows how to use moving AP information, e.g., a venue info element, communicated from an AP to a UE, which contains information about the mobility status, also denoted mobility state, of the AP, to specify how the network, UE, or end-user should act if the AP mobility status indicates that the AP is currently moving. Again, any suitable method that determines the mobility status of a Wi-Fi AP may be used. The Wi-Fi AP may in the following, depending on the circumstances, be referred to as a mobile AP, a moving AP, or just an AP. The Wi-Fi AP is an example of a radio node. According to example embodiments herein, a user equipment may determine a mobility state of the radio node as one of a moving mobility state and a non-moving mobility state, also denoted a standing mobility state. The mobility state may in some embodiments be determined by detecting the Wi-Fi AP and determining whether or not the Wi-Fi AP is a moving AP based on a moving AP indication. The UE may further determine control information relating to UE cell (re-)selection and/or handover behavior based on the determined mobility state of the radio node. The control information may in some embodiments be network-based cell (re-)selection and/or handover control information that may be received from a cellular base station of the network. Additionally or alternatively, the control information may be policies and other information relating to the status, radio conditions, and/or preferences of the UE. The UE may then control its cell (re-)selection and/or handover behavior based on the determined control information.

In a first non-limiting example embodiment, the UE reports the mobility status of the AP to the network as part of its neighbor cell process reporting. The mobility status of the AP is then used as an input to a network-controlled cell-selection procedure. In a second non-limiting example embodiment, a moving AP is included in a list of wireless network connection alternatives provided to a UE user. The user decides whether to accept connecting to the mobile access point. For example, a user-controllable setting in a UE may be configured not to connect to moving access points unless the end-user manually allows or selects the connectivity when entering a train or a bus. In a third non-limiting, example embodiment, policies configured in the UE by the network operator are enhanced to also take into account the "moving AP" indication.

In the first example embodiment, a first implementation example alternative is for an AP to broadcast a "moving AP" indication as part of broadcast system information. For example, the UE may report to the network the mobility status of the AP as part of the UE's neighbor cell reporting, and the network acts on this AP mobility information as part of a network controlled cell selection procedure for the UE. A node in the network for example avoids instructing the UE to select or switch to the mobile AP unless and until the network node discovers information that indicates that the UE is moving with the moving AP. Examples of such a node include a base station, a radio network controller, a base station controller, a dedicated mobility server, etc.

Figure 9A:
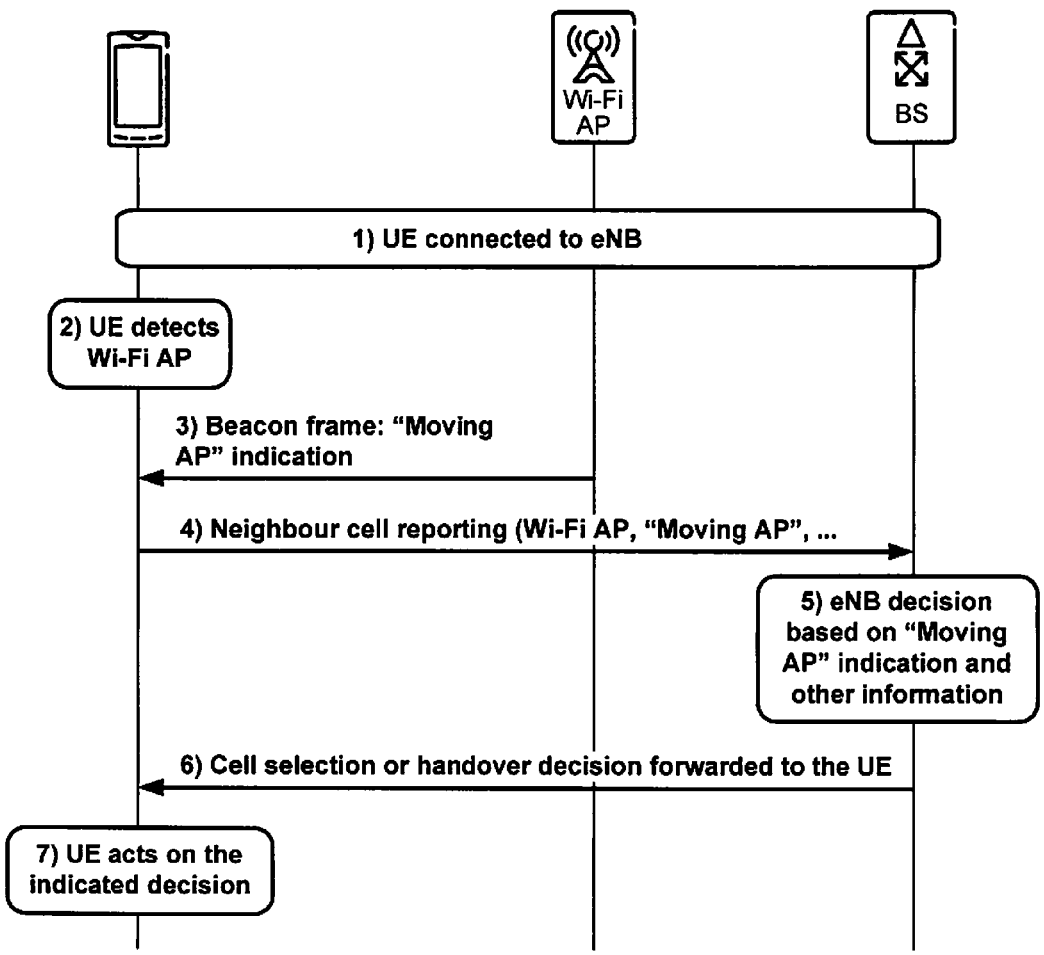
FIG. 9A is a diagram showing example signaling between a UE, an AP, and a base station for reporting a moving AP indication to the network in accordance with a first non-limiting example embodiment.

FIG. 9A is a diagram showing example signaling between a UE, an AP, and an eNB base station for reporting a moving AP indication to the network in accordance with the first example embodiment. Here, the UE is connected to a cellular base station (BS), e.g., eNB in LTE/E-UTRAN, and detects a Wi-Fi AP that transmits a "Moving AP" indication. In step 1), the UE connects with the eNB, and in step 2), the UE detects the AP including the AP's beacon frame which includes a Moving AP indication as shown at signal 3). The Moving AP indication can also be retrieved using other signaling like the probe request/response frames and ANQP signaling. The UE sends a neighbor cell report to the base station at 4). The BS makes a cell (re-)selection or handover decision for the UE based on the received Moving AP indication at 5) and sends a signal at 6) to inform the UE of that decision. At 7), the UE then takes the BS cell selection or handover decision into account before determining whether to select or handover to the AP. Typically, this means that the UE follows the BS decision.

Figure 9B:
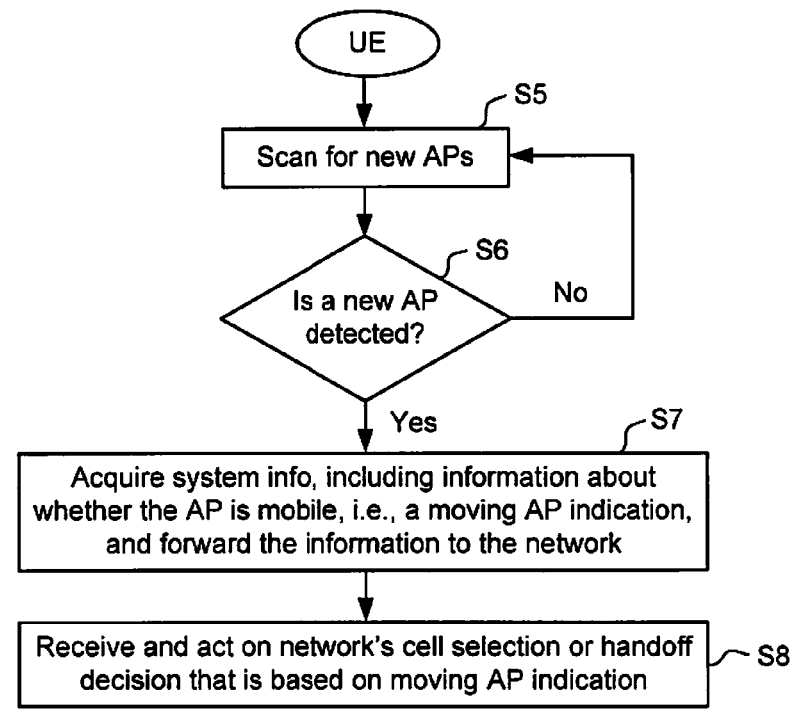
FIG. 9B is a flowchart illustrating non-limiting example steps performed by a UE in accordance with the first example embodiment.

FIG. 9B is a flowchart illustrating non-limiting example steps performed by a UE in accordance with the first example embodiment. In step S1, the UE scans for new APs, and if a new AP is detected (step S2), the UE acquires system information from that AP including whether the AP is moving, i.e., a moving AP indication, and forwards that information to the network (step S3). The UE then acts upon a BS cell selection or handover decision by a network node, e.g., a BS, which was based on the forwarded moving AP information or indication (step S4).

Figure 9C:
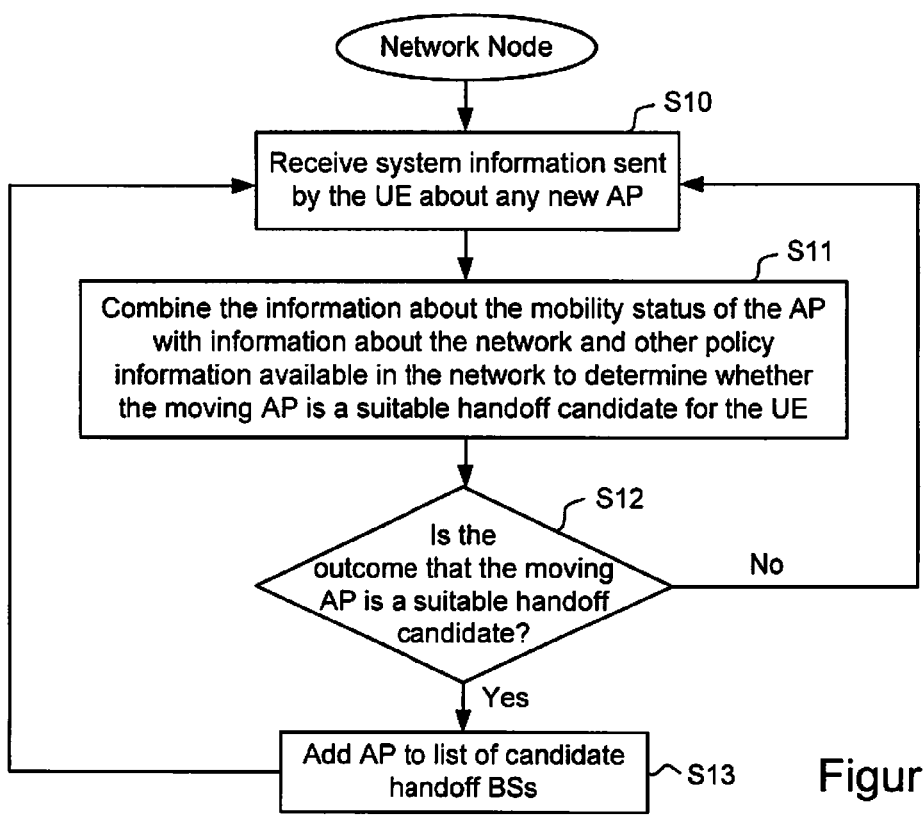
FIG. 9C is a flowchart illustrating non-limiting example steps performed by a base station in accordance with the first example embodiment.

FIG. 9C is a flowchart illustrating non-limiting example steps performed by a network node, e.g., a base station, in accordance with the first example embodiment. The BS receives moving AP information from a UE about one or more new APs detected by the UE (step S10). The BS combines this moving AP information and other policy information available in the network, if desired, to determine whether the moving AP is a suitable cell selection or handover candidate for the UE (step S11). A decision is made at step S12 whether the moving AP is a suitable cell selection or handover candidate for the UE, and if so, the moving AP or the cell served by the AP is added to the UE's base station or cell candidate list (step S13). This may then result in the network's cell (re-)selection or handoff decision based on the moving AP indication being sent to the UE. Otherwise, control returns to step S10.

A second example embodiment provides an end user controllable handling of "Moving AP" indication. In case of terminal controlled cell selection, a moving AP indication would be used by the terminal to decide whether or not to connect to the cell. This could result either in displaying the access point as mobile and let the subscriber manually decide whether or not to connect to it, or result in a pre-defined end-user controlled mobile behavior like automatically avoiding connecting unless certain other criteria are met like the UE measuring its own speed to match that of the moving base station.

Figure 10A:
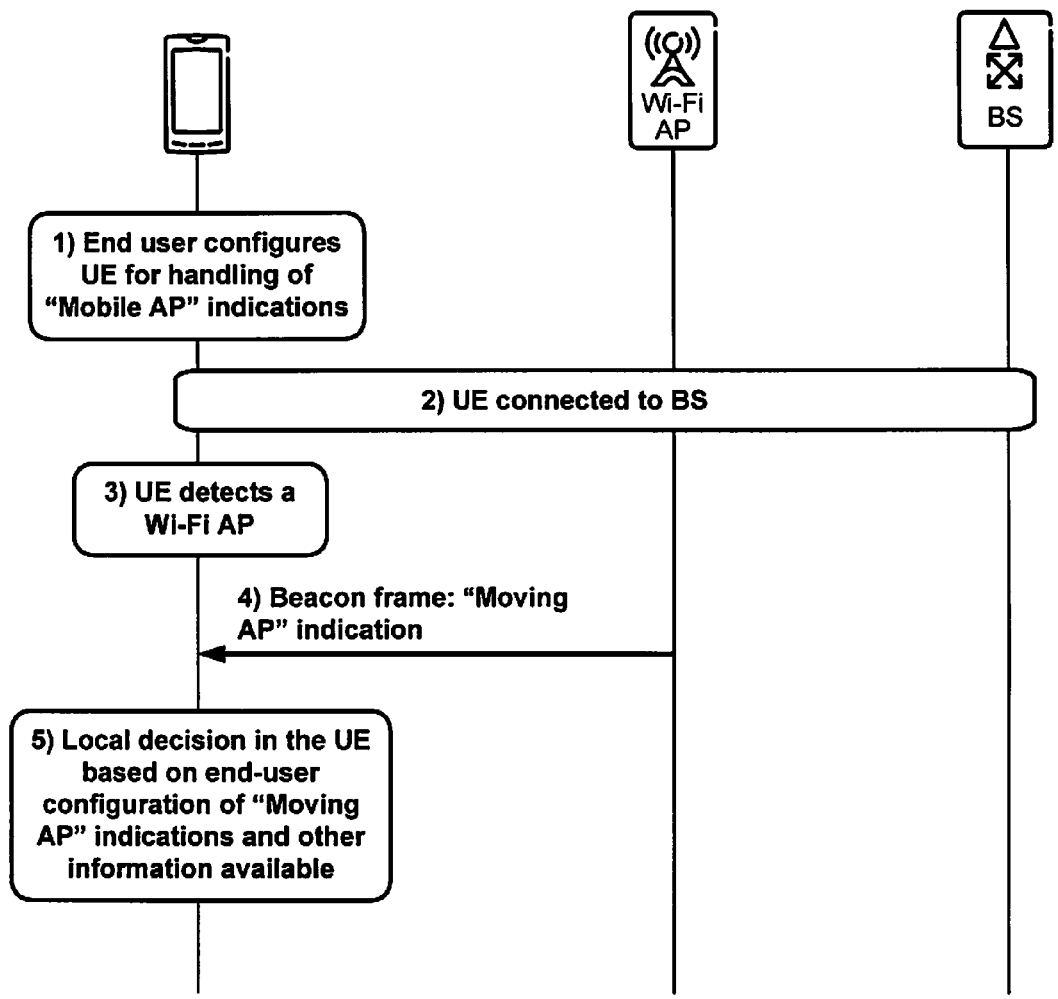
FIG. 10A is a diagram showing example signaling between a UE, an AP, and a base station for using a moving AP indication locally in the UE based on end user configuration in accordance with a second non-limiting example embodiment.

FIG. 10A is a diagram showing example signaling between a UE, an AP, and a base station for using a moving AP indication locally in the UE based on end user configuration in accordance with a second example embodiment. In step 1), the UE user configures the UE for handling Mobile AP indications. In optional step 2) shows the UE is connected to a cellular base station (BS), e.g., eNB in LTE/E-UTRAN. The UE detects a Wi-Fi AP that transmits a "Moving AP" indication at signaling step 3). In step 4), the UE receives for example the AP's beacon frame which includes a Moving AP indication. Step 5) shows that a local decision is then made at the UE based on an end user's configuration of "Moving AP" indications and possibly other available information.

Figure 10B:
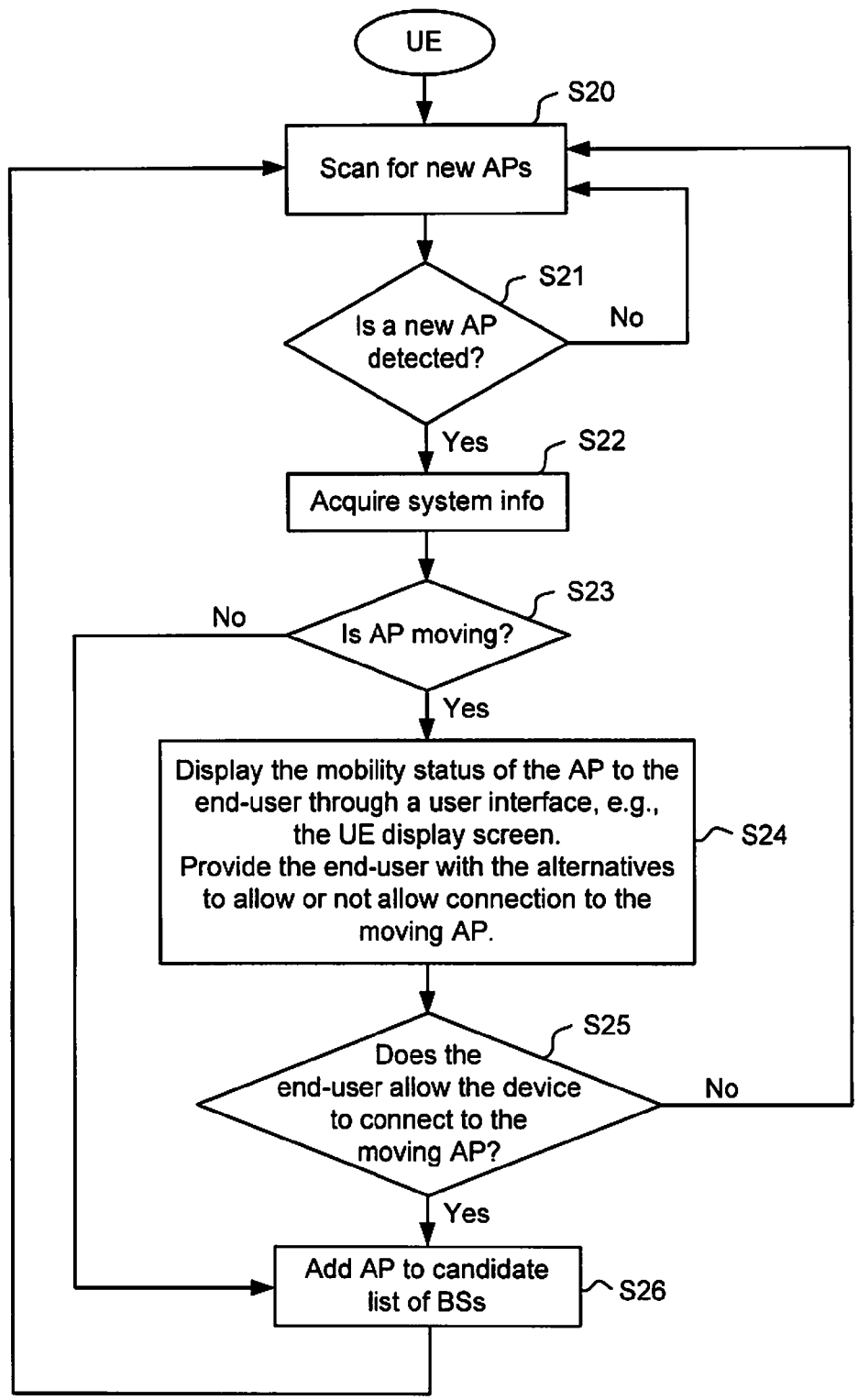
FIG. 10B is a flowchart illustrating non-limiting example steps performed by a UE in accordance with the second example embodiment.

FIG. 10B is a flowchart illustrating non-limiting example steps performed by a UE in accordance with the second example embodiment. In step S20, the UE scans for new APs, and if a new AP is detected (Yes in step S21), the UE acquires system information from that AP including information regarding whether the AP is moving, i.e., a moving AP indication e.g. via beacon frame, probe response frame or ANQP signaling (step S22). In decision step S23, the UE determines whether the AP is moving based on the moving AP indication, and if it is, displays the mobility status of the AP to the end-user through a user interface, e.g., the UE display screen and provides the end-user with the alternatives to allow or not allow connection to the moving AP (step S24). Otherwise, control proceeds to step S26. The UE makes a decision in step S25 whether the UE user allows the UE to connect to the moving AP. An alternative is for the user to configure its UE with one or more connection policies for handling a moving AP indication. If allowed by the user or by a user-configured policy, or if the AP is determined not to be moving in step S23, and the AP meets one or more criteria, such as sufficient received signal strength or quality at the UE, the UE adds the AP to its candidate list of base stations or cells (step S26). Control ultimately returns to S20 for the UE to scan for new APs.

Figure 11A:
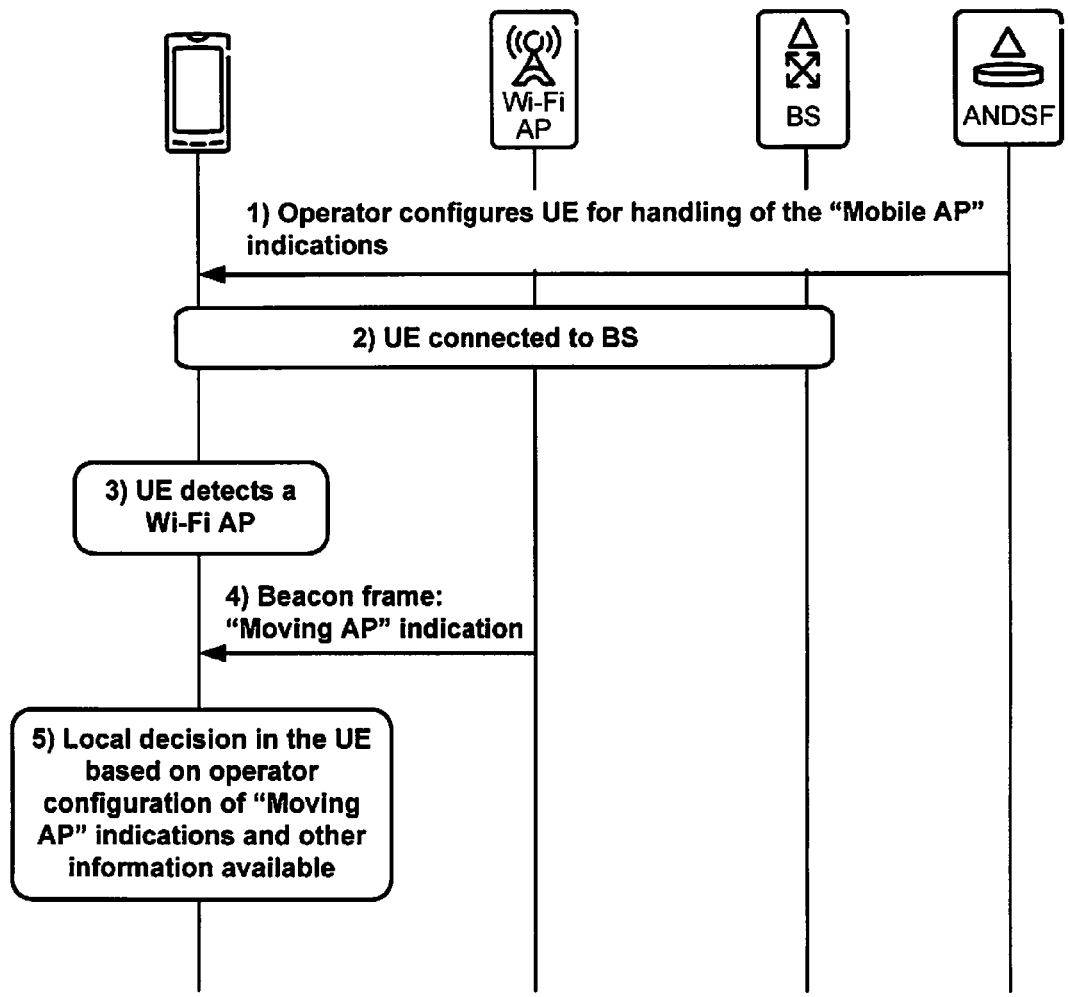
FIG. 11A is a diagram showing example signaling between a UE, an AP, and a base station for using a moving AP indication locally in the UE based on operator provided configuration in accordance with a third non-limiting example embodiment.

FIG. 11A is a diagram showing example signaling between a UE, an AP, and a base station for using a moving AP indication locally in the UE based on operator provided configuration in accordance with a third example embodiment. In step 1), an operator via e.g. an ANDSF node, e.g., a computer server coupled to the cellular network, configures the UE for handling Mobile AP indications. The optional step 2) shows the UE is connected to a cellular base station (BS), e.g., eNB in LTE. In step 3), the UE detects a Wi-Fi AP. The Wi-Fi AP transmits for example a beacon frame which includes a Moving AP indication at signaling step 4). Step 5) shows that a local decision is then made at the UE based on an operator's configuration of "Moving AP" indications and possibly other available information.

Figure 11B:
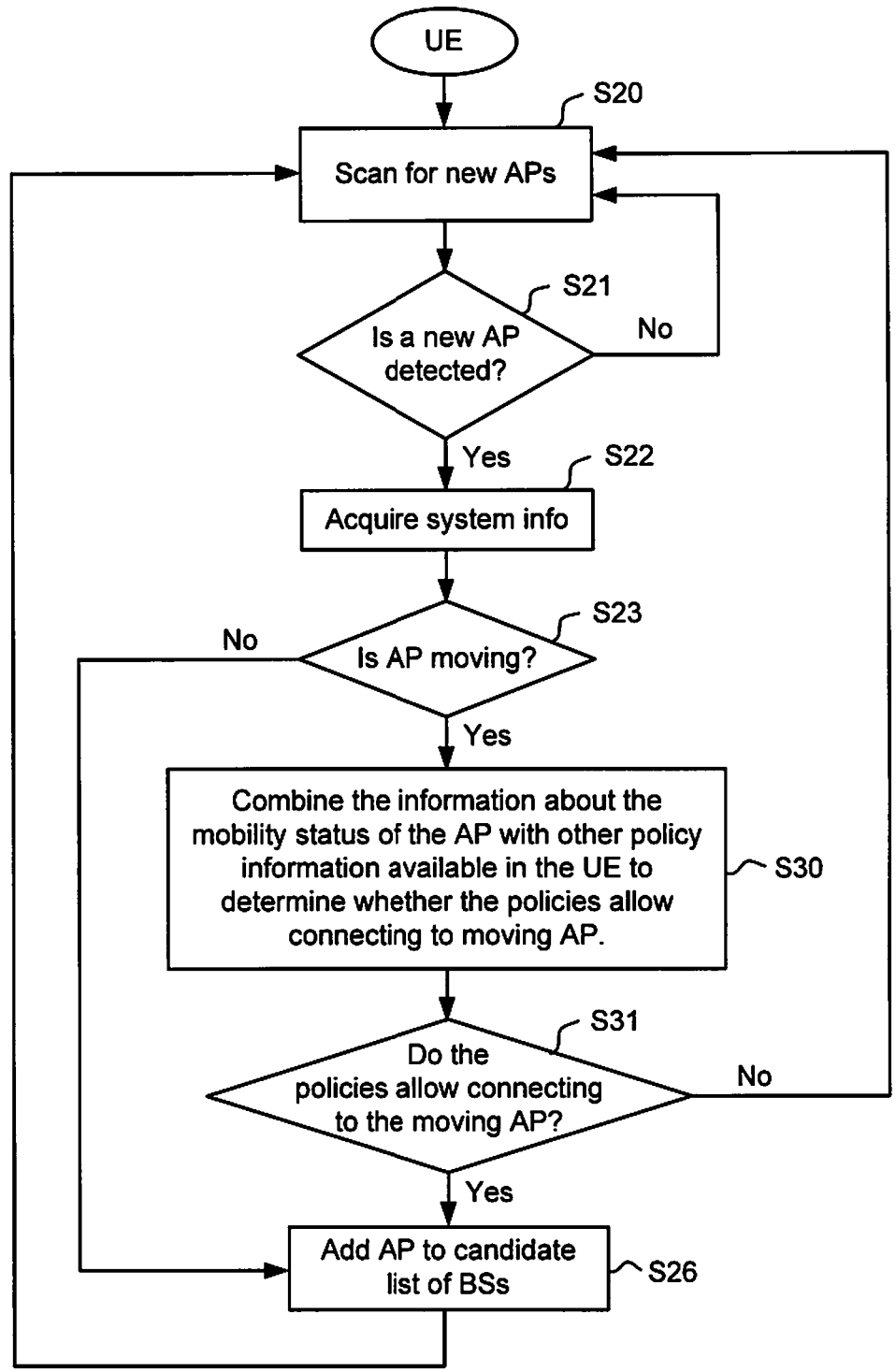
FIG. 11B is a flowchart illustrating non-limiting example steps performed by a UE in accordance with the third example embodiment.

FIG. 11B is a flowchart illustrating non-limiting example steps performed by a UE in accordance with the third example embodiment. In step S20, the UE scans for new APs, and if a new AP is detected (Yes in step S21), the UE acquires system information from that AP including information regarding whether the AP is moving, i.e., a moving AP indication (step S22). In decision step S23, the UE determines whether the AP is moving based on the moving AP indication, and if it is, the UE combines the information about the mobility status of the AP with other policy information available to the UE to determine whether the policies allow connecting to the moving AP at step S30. Otherwise, control proceeds to step S26. The UE makes a decision in step S31 whether the policies allow connecting to the moving AP. If allowed, or if the AP is determined not to be moving in step S23, and the AP meets one or more criteria, such as sufficient received signal strength or quality at the UE, the UE adds the AP to its candidate list of base stations or cells (step S26). Control ultimately returns to S20 for the UE to scan for new APs.

Figure 12:
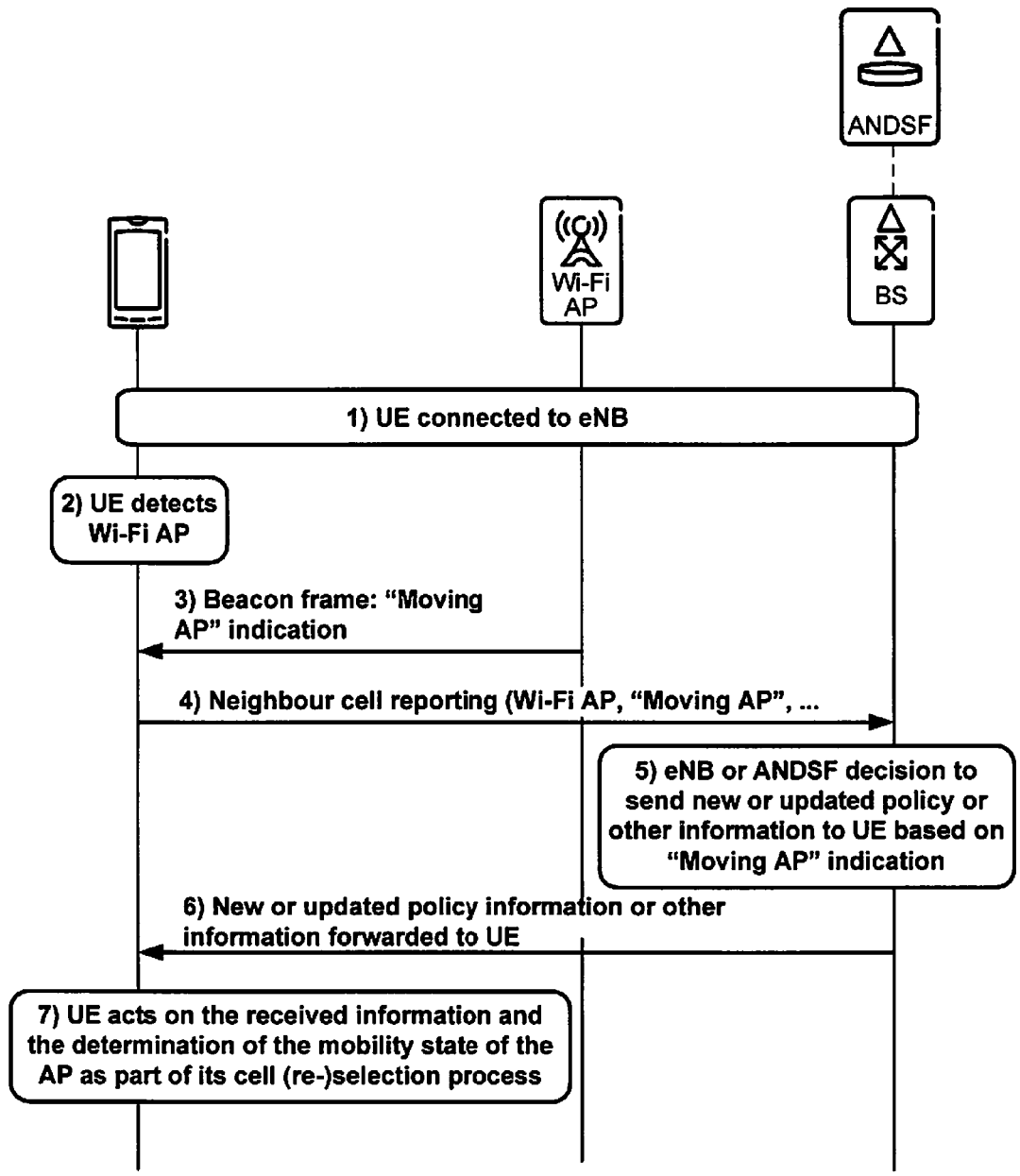
FIG. 12 is a diagram showing example signaling between a UE, an AP, and a base station or ANDSF server for reporting a moving AP indication to the base station or ANDSF server in accordance with a fourth non-limiting example embodiment.

FIG. 12 is a diagram showing example signaling between a UE, an AP, and a base station or ANDSF server for reporting a moving AP indication to the base station or ANDSF server in accordance with a fourth non-limiting example embodiment. Signaling steps 1)-4) are similar to those in FIG. 9A except that at 4) the report may be sent to a base station or to an ANDSF server. The report may also be forwarded by the base station to the ANDSF server. At 5), the base station or ANDSF server processes the mobility status of the AP reported by the UE, and sends new or updated policy or other information to the UE based on the moving AP indication at 6). The UE acts on that new or updated policy or other information as well as the detected mobility state of the AP in a cell (re-)selection process.

Figure 13:
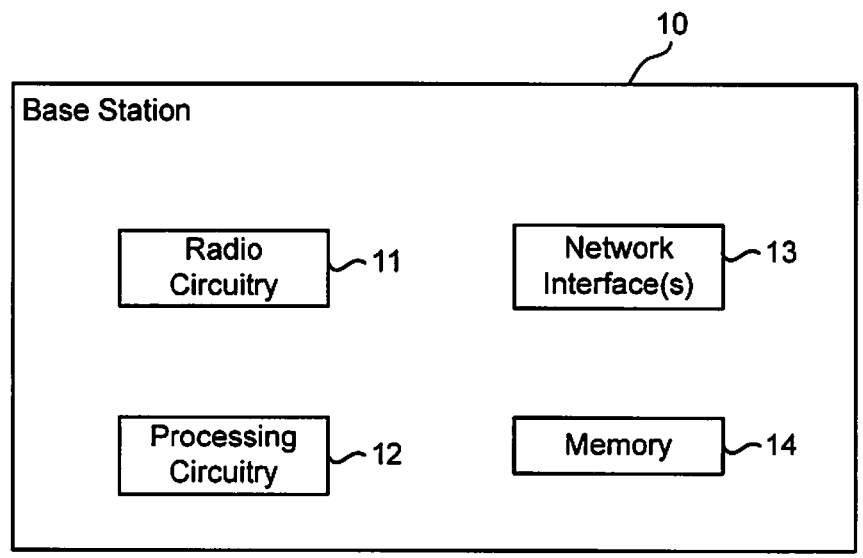
FIG. 13 is a function block diagram of an example radio node corresponding to a base station and/or an access point.

FIG. 13 is a function block diagram of an example radio node corresponding to a radio base station 10. Radio circuitry 11 permits radio communications with UEs and may include for example one or more antennas, transmitter and receiver functions, conversion between Radio Frequency (RF) and baseband, baseband processing, etc. One or more network interfaces 13 allow the base station to communicate with other network nodes including for example other relay nodes, base station nodes, base station control nodes, core network nodes, stand alone nodes, etc. Processing circuitry 12 performs the AP functions described above. Memory 14, which may be one or more memories, may store instructions for execution by the processing circuitry 12 as well as data, including for example, measurement data from UEs, conditions, parameters, etc. Blocks 11-14 may communicate using one or more communication buses. An AP includes apparatus similar to that shown in FIG. 13 with radio circuitry being configured to perform radio communication with UEs using Wi-Fi communication protocols over the air interface and different network interfaces to Wi-Fi-based network nodes.

Figure 14:
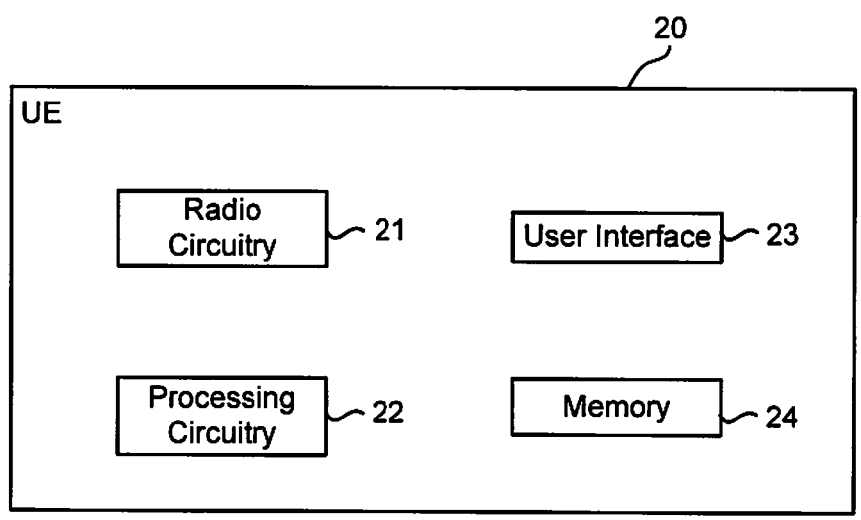
FIG. 14 is a function block diagram of an example UE.

FIG. 14 is a function block diagram of an example UE 20. Radio circuitry 21 permits radio communications with radio nodes like relay nodes, base stations, Wi-Fi access points (APs), etc. and may include for example one or more antennas, transmitter and receiver circuitry, conversion circuitry for converting between RF and baseband, baseband processing circuitry, etc. The radio circuitry 21 may for example employ dedicated radio circuitry for cellular system communications and dedicated radio circuitry for Wi-Fi communications, shared radio circuitry for all of both cellular and Wi-Fi communications, or some combination of dedicated and shared circuitry. A user interface 23 allows information to be provided to a user both audibly and visually and also allows the user to direct the UE to perform various data processing and communication operations. The interface 23 includes one or more output mechanisms, e.g., display, speaker, speech synthesizer, etc. and one or more input mechanisms, e.g., keypad, touch screen, microphone, voice recognition processing, etc. Processing circuitry 22 performs the UE functions described above. Memory 24, which may be one or more memories, may store instructions for execution by the processing circuitry 22 as well as data, including for example, measurement data to be reported, conditions, parameters, etc. Blocks 21-24 may communicate using one or more communication buses.

Still other aspects of the technology include one or more computer products embodied in a non-transitory, computer-readable storage medium containing instructions, which when executed by processing circuitry, perform the functions described above for the AP and UE. For example, one non-transitory, computer-readable storage medium is configured for use with an AP, and another non-transitory, computer-readable storage medium is configured for use with UEs.

Various other example mechanisms to identify or determine the mobility state of a mobile AP are described in commonly-assigned patent application entitled "Mobility State Aware Mobile Relay Operation," U.S. Provisional Application No. 61/523,973, the disclosure of which is incorporated herein by reference, may be used to identify the mobility state of an AP.

The technology described above offers a number of example advantages in a situation where a UE may communicate with both cellular base stations and Wi-Fi access points. First, the UE is actively informed that an AP or other type of base station is a moving AP. This information allows the UE and/or the UE user to make an informed decision about whether to connect to that AP. Second, being so informed helps prevent overloading a moving AP on-board a moving vehicle from being overloaded by stationary UEs, e.g., while the AP moves through busy areas. Third, the technology described above prevents a potentially very large amount of mobility signaling from stationary UEs connecting and disconnecting from a moving AP within a short period of time, i.e., ping pong handovers. Fourth, the technology decreases the risk for poor performance for stationary UEs associated with cell (re-)selection and/or handovers resulting from connect and disconnect to a moving AP.

Although the description above contains many specifics, these should not be construed as limiting the scope of the claims but as merely providing illustrations of example embodiments. It will be appreciated that the technology claimed fully encompasses other embodiments which may become apparent to those skilled in the art, and that the scope of the claims is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are intended to be encompassed hereby. Moreover, it is not necessary for a device or method to address each and every problem sought to be solved for it to be encompassed hereby. No element, block, or instruction used in the present application should be construed as critical or essential to the implementations described herein unless explicitly described as such. Further, the phrase "based on" is intended to mean "based, at least in part, on" unless explicitly stated otherwise. Unclaimed subject matter is not dedicated to the public, and all rights are reserved in unclaimed subject matter including the right to claim such subject matter in this and other applications, e.g., continuations, continuations in part, divisions, etc.

The invention claimed is:

1. A user equipment, UE, comprising:
   radio circuitry configured to:
      communicate with a Wi-Fi access point, AP, and a cellular base station, BS; and
      receive, as control information, information from the cellular BS based on a moving AP indication; and
   processing circuitry configured to:
      detect the Wi-Fi AP;
      determine a mobility state of the Wi-Fi AP as one of a moving mobility state and a non-moving mobility state based on the moving AP indication, wherein the mobility state of the Wi-Fi AP is determined based on a beacon frame or a probe response frame received from the Wi-Fi AP that includes the moving AP indication or an Access Network Query Protocol, ANQP, signaling that includes the moving AP indication;

determine control information relating to one or more of UE cell selection, cell reselection, and handover behavior based on the determined mobility state of the Wi-Fi AP;

control one or more of UE cell selection, cell reselection, and handover behavior in relation to the Wi-Fi AP based on the determined control information; and connect to the Wi-Fi AP based on the received information and the determined mobility state of the Wi-Fi AP.

2. The UE in claim 1, wherein the processing circuitry is configured to generate a neighbor cell report that includes a cell served by the Wi-Fi AP as a neighbor cell in the report and the moving AP indication for the Wi-Fi AP, and wherein the radio circuitry is configured to transmit the neighbor cell report to the cellular BS.

3. The UE in claim 2, wherein: the received information comprises one or more of network-based cell selection, cell reselection, and handover control information determined based on the moving AP indication, and the processing circuitry is configured to connect to the Wi-Fi AP based on the network-based cell selection, cell reselection or handover control information.

4. The UE in claim 1, wherein the UE is configured by a user to detect and process the moving AP indication, wherein the processing circuitry is configured to receive from the user of the UE a user decision whether to perform one or more of a cell selection, cell reselection, and handover to the Wi-Fi AP based on the determined moving AP indication, and wherein the control information includes the user's decision or policies configured by the user.

5. The UE in claim 1, wherein the UE is configured by a network operator to detect and process moving AP indications, and wherein the processing circuitry is configured to decide locally at the UE whether to perform one or more of a cell selection, cell reselection, and handover to the Wi-Fi AP based on the determined moving AP indication.

6. The UE in claim 5, wherein the UE is configured by a network operator with policy information to detect and process moving AP indications, and wherein the control information includes the policy information.

7. The UE in claim 1, wherein the moving AP indication includes AP venue information.

8. A method implemented in a user equipment, UE, comprising:

detecting a Wi-Fi access point, AP;

determining a mobility state of the Wi-Fi AP as one of a moving mobility state and a non-moving mobility state based on a moving AP indication, wherein the mobility state of the Wi-Fi AP is determined based on a beacon frame or a probe response frame received from the Wi-Fi AP that includes the moving AP indication or an Access Network Query Protocol, ANQP, signaling that includes the moving AP indication;

receiving, as control information, information from a cellular base station, BS based on the moving access point indication; and determining control information relating to one or more of UE cell selection, cell reselection, and handover behavior based on the determined mobility state of the Wi-Fi AP;

controlling one or more of UE cell selection, cell reselection, and handover behavior in relation to the Wi-Fi AP based on the determined control information; and connecting to the Wi-Fi AP based on the received information and the determined mobility state of the Wi-Fi AP.

9. The method in claim 8, further comprising:

generating a neighbor cell report that includes a cell served by the Wi-Fi AP as a neighbor cell in the report and the moving AP indication for the Wi-Fi AP, and transmitting the neighbor cell report to a cellular BS.

10. The method in claim 9, wherein:

the received information comprises one or more of network-based cell selection, cell reselection, and handover control information determined based on the moving AP indication, and the method comprises:

connecting to the Wi-Fi AP based on the network-based cell selection cell reselection, or handover control information.

11. The method in claim 8 wherein the UE is configured by a user to detect and process the moving AP indication, the method further comprising:

receiving from the user of the UE a user decision whether to perform one or more of a cell selection, cell reselection, and handover to the Wi-Fi AP based on the determined moving AP indication, wherein the control information includes the user's decision or policies configured by the user.

12. The method in claim 8, further comprising:

receiving network operator policy information, and deciding whether to perform one or more of a cell selection, cell reselection, and handover to the Wi-Fi AP based on the determined moving AP indication and the received policy information, wherein the control information includes the received policy information.

13. The method in claim 8, wherein the moving AP indication includes AP venue information.

14. A computer product embodied in a non-transitory, computer-readable storage medium containing instructions, which when executed by data processing circuitry, perform the method recited in claim 8.

* * * * *